United States Patent
Virdee

(10) Patent No.: US 6,186,447 B1
(45) Date of Patent: Feb. 13, 2001

(54) AUTOTHROTTLE RETARD RATE CONTROL SYSTEM

(75) Inventor: Arvinder S. Virdee, Mill Creek, WA (US)

(73) Assignee: The Boeing Company, Seattle, WA (US)

(*) Notice: Under 35 U.S.C. 154(b), the term of this patent shall be extended for 0 days.

(21) Appl. No.: 09/107,340

(22) Filed: Jun. 30, 1998

Related U.S. Application Data

(60) Provisional application No. 60/065,050, filed on Nov. 10, 1997.

(51) Int. Cl.[7] ............................... G05D 1/12; F02K 3/00; B64C 5/00

(52) U.S. Cl. ............................... 244/188; 60/233; 60/39.2; 244/75 R

(58) Field of Search ................................ 244/182, 188, 244/187, 194, 195; 60/233, 39.24, 39.281; 364/528.22, 528.39, 528.37, 737

(56) References Cited

U.S. PATENT DOCUMENTS

| | | | |
|---|---|---|---|
| 3,691,356 | * 9/1972 | Miller | 244/182 |
| 3,908,934 | * 9/1975 | Schloeman | 244/182 |
| 3,981,442 | * 9/1976 | Smith | 244/182 |
| 3,989,208 | * 11/1976 | Lambregts | 244/182 |
| 4,232,839 | * 11/1980 | Sicre et al. | 244/188 |
| 4,259,838 | * 4/1981 | McCollum, Jr. et al. | 60/224 |
| 4,541,237 | * 9/1985 | Dickey | 60/39.281 |
| 4,551,972 | * 11/1985 | Lewis | 60/39.281 |
| 4,569,021 | * 2/1986 | Larson et al. | 244/182 |
| 4,764,872 | * 8/1988 | Miller | 244/182 |
| 5,029,778 | * 7/1991 | DeLuca | 244/234 |
| 5,039,037 | * 8/1991 | DeLuca | 244/194 |
| 5,836,546 | * 11/1998 | Gast | 244/182 |

* cited by examiner

Primary Examiner—Peter M. Poon
Assistant Examiner—Francis T. Palo
(74) Attorney, Agent, or Firm—Christensen O'Connor Johnson Kindness PLLC

(57) ABSTRACT

In an autothrottle system having the capability to reduce engine throttle setting from a first position to an idle position, an improvement including calculating a rate of throttle reduction as a function of the combination of a nominal retard rate value (10) and a retard rate adjustment value (12). In one embodiment, the nominal retard rate value (10) is equal to the angular difference between a current engine throttle control lever position (TRA) and an idle engine throttle control lever position (TRAIDLE), the difference being divided by an amount in the range of about 3 seconds to about 10 seconds. The retard rate adjustment value (12) is calculated as a function of the difference between current airspeed ($V_C$) and a commanded airspeed ($V_{CMD}$). During an underspeed condition, the retard rate adjustment signal decreases the rate of throttle reduction from the nominal retard rate value (10). During an overspeed condition, the retard rate adjustment signal increases the rate of throttle reduction from the nominal retard rate value (10).

12 Claims, 1 Drawing Sheet

AUTOTHROTTLE RETARD RATE CONTROL SYSTEM

CROSS-REFERENCE TO RELATED APPLICATION

The present application claims the benefit of U.S. Provisional Patent Application Ser. No. 60/065,050, filed Nov. 10, 1997.

FIELD OF THE INVENTION

The present invention relates to aircraft engine throttle systems, and more particularly, to aircraft autothrottle control systems used during automatic landing procedures.

BACKGROUND OF THE INVENTION

Current commercial aircraft include the capability to be flown either manually or using automatic control systems. For example, in many aircraft, it is typical to have an autothrottle, an autopilot, and a Flight Management Computer (FMC). Each of these systems is interrelated to the others, with a hierarchy of control levels existing between the systems, e.g., flight management computers are arranged to control both the autopilot and the autothrottle, autopilots are arranged to control the autothrottle, etc. By adding a Mode Control Panel (MCP), a wide range of flight modes become available for use by the pilot.

When landing an aircraft (either manually or using an automatic mode), it is typical to use the autothrottle to reduce the engine thrust to idle when the aircraft reaches a certain altitude. For example during an automatic landing, upon reaching 24 feet, the autothrottle will move the engine control lever to idle. The rate at which the lever is moved depends on the existing lever position, e.g., a lever position that is already close to idle will move slower than a lever position that is farther from idle. Typical throttle lever rate movements are between about −2.2 degrees per second to about −1.7 degrees per second. A negative sign refers to a resulting reduction in engine throttle setting. The vertical rate at which the aircraft actually lands on the runway (referred to as the vertical speed or sink rate at touchdown) is often influenced by current wind and weather conditions, and is quite dependent upon the reduction of throttle to idle.

During the aircraft landing maneuver, wind changes that reduce the airplane airspeed (referred to as an underspeed condition) may result in a reduction of airplane elevator effectiveness and in a high sink rate at touchdown. This may be felt as a hard bump at touchdown, which can cause discomfort to some passengers and can cause wear to the landing gear. Underspeed conditions are also associated with short landing distances.

Conversely, a wind change resulting in an airspeed increase (referred to as an overspeed condition) will result in increased lift on the wing and oppose the elevator commands to land the airplane on the runway. During overspeed conditions the airplane will float down the runway, resulting in a very soft landing but undesirably requiring excessive runway distance within which to decelerate and come to a full stop.

Thus, a need exists for an autothrottle system having the capability to guide the aircraft during landing to avoid landing too hard in order to minimize any possibility of passenger discomfort. The ideal system would further foresee and help to avoid those situations in which excessive runway distance may be required for touchdown and that will result in less runway within which to decelerate. The present invention is directed to fulfilling these needs.

SUMMARY OF THE INVENTION

In accordance with aspects of the present invention, in an autothrottle control system having capability to reduce engine throttle setting from a first position to an idle position, an improvement is provided including calculating a rate of throttle reduction as a function of the difference between current airspeed and a commanded airspeed. In one embodiment, the rate of throttle reduction is a function of a combination of a nominal retard rate value and a retard rate adjustment value. The retard rate adjustment value is preferably calculated as a function of the difference between current airspeed and a commanded airspeed. In one embodiment, the retard rate adjustment value is a latched difference.

In accordance with aspects of this invention, the nominal retard rate value is equal to the angular difference between a current engine throttle control lever position and an idle engine throttle control lever position, the difference being divided by an amount in the range of about 3 seconds to about 10 seconds.

In accordance with aspects of this invention, when the difference between current airspeed and a commanded airspeed is at or between about −2.5 knots and +2.5 knots, the retard rate adjustment value is set to zero. The retard rate adjustment value varies linearly at difference values of less than and greater than these amounts. In another embodiment, when the difference between current airspeed and a commanded airspeed is less than about −8.5 knots the retard rate adjustment value is set to about +1.2 degree per second. In yet another embodiment, when the difference between current airspeed and a commanded airspeed is greater than about +8.5 knots the retard rate adjustment value is set to about −1.2 degree per second. The retard rate varies linearly when the difference is between −2.5 to −8.5 and +2.5 to +8.5.

In accordance with aspects of this invention, the calculating of the rate of throttle reduction is accomplished during a flare approach maneuver with an autopilot system engaged and the aircraft at or below about 24 feet. In one embodiment, the calculating of the rate of throttle reduction is accomplished during a flare approach maneuver with an autopilot system engaged and the aircraft is at or below about 24 feet.

In accordance with aspects of this invention, the improvement includes a throttle rate reduction signal formed from a combination of a nominal retard rate signal and a retard rate adjustment signal. During an underspeed condition the retard rate adjustment signal decreases the rate of throttle reduction, and during an overspeed condition the retard rate adjustment signal increases the rate of throttle reduction.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
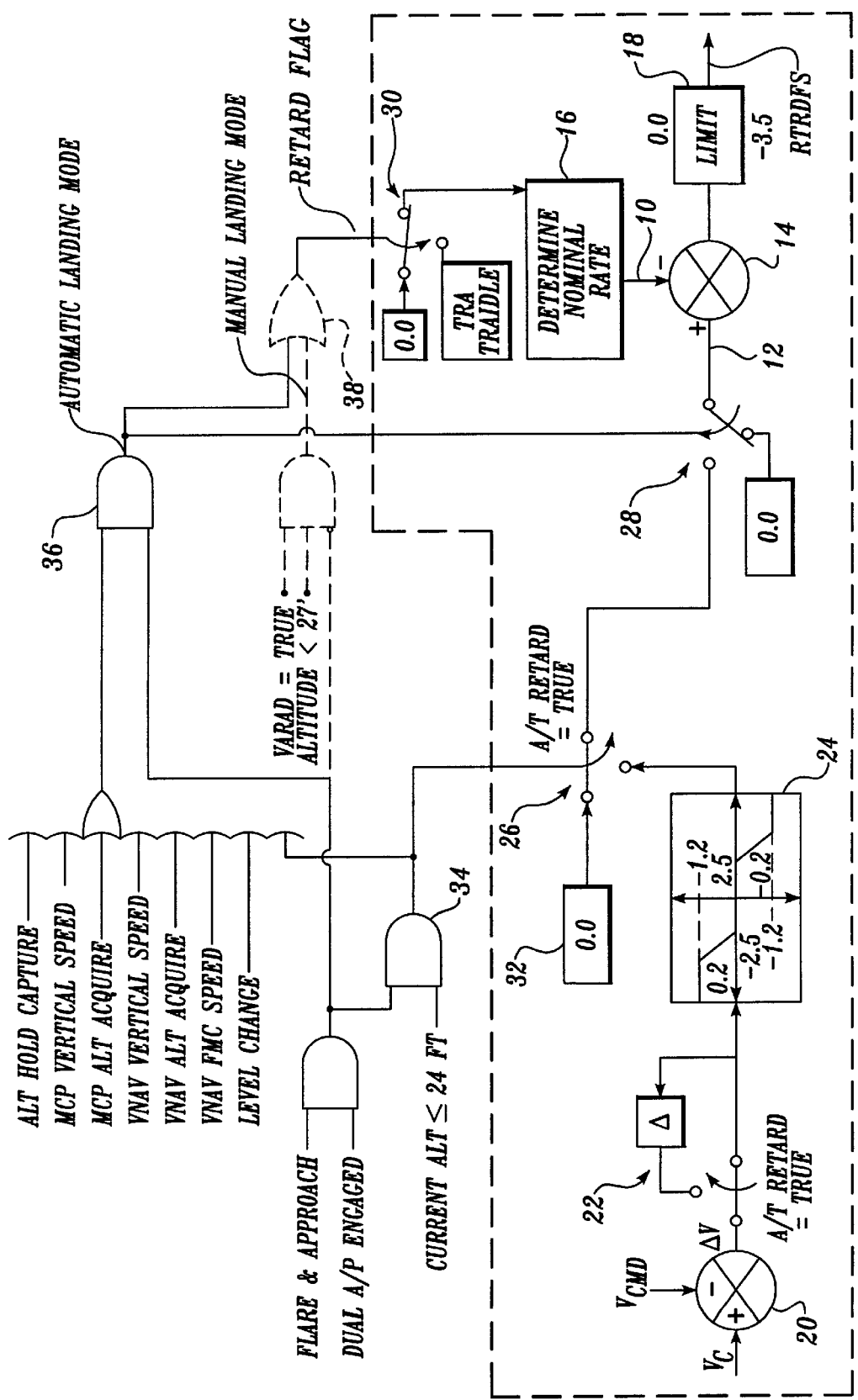
FIG. 1 is a control schematic of one embodiment of a throttle automatic landing retard rate system formed in accordance with the present invention.

The present invention is an improved autothrottle system having the capability to vary the rate at which the engine throttles are retarded to idle during an automatic landing (e.g., when using a digital flight control system such as an autopilot), depending on whether a longitudinal underspeed or overspeed condition exists. For an underspeed condition, the present autothrottle system reduces the rate at which the throttles are decreased. For an overspeed condition, the present invention autothrottle system increases the rate at which the throttles are decreased. FIG. 1 presents one embodiment of such a rate variation scheme. Other embodiments are possible and should be considered within the scope of the present invention.

It is to be understood that while the invention is illustrated and described in the form of a control law and logic gates containing discrete elements designed to accomplish specific functions, it is to be understood that the invention can be actually implemented in various ways. For example, the functions of the illustrated control law can be carried out by a suitably programmed digital computer system. Alternatively, the functions can be carried out by digital or analog circuits or other means. Examples of analog means include linear amplifiers, capacitors, inductors, transistors, resistors, and networks including some or all of these devices. Examples of digital means include binary adder-subtractors, comparators, inverters, controlled counters, digital processors that sequentially process digitally encoded data, and shift registers in an arithmetic logic unit of a central processing unit.

Referring to the embodiment of FIG. 1, the rate at which the engine throttles are reduced to idle, that is the "retard rate", is represented by an output signal RTRDFS. This signal is preferably given in terms of degrees of throttle lever movement per second. As shown in the FIG. 1, the retard rate signal RTRDFS is calculated as the difference between a nominal retard rate signal 10 and a calculated retard rate adjustment signal 12. The calculation is accomplished at a first combiner 14. The amount of adjustment is a function of the magnitude of the underspeed or overspeed condition. As used herein, the term "combiner" is to be broadly interpreted, and includes signal combinations such as addition, subtraction, multiplication, and division.

Referring to block 16, the nominal retard rate signal 10 is calculated to be the angular difference between the current position of the throttle lever, TRA (Throttle Resolver Angle) and the position of the lever at engines idle, TRAIDLE. This difference is divided by the approximate amount of time it will take the aircraft to move from the retard trigger altitude to touchdown.

$$\text{Nominal Retard Rate Signal} = \frac{TRA - TRAIDLE}{6} \text{(degrees/second)} \quad (1)$$

The resulting difference between the nominal retard rate signal 10 and the calculated retard rate adjustment signal 12 is a negative number. A limiter 18 is provided to limit the retard rate output signal RTRDFS to a value between an upper limit and a lower limit. Shown in FIG. 1, the output signal is limited to at or between 0.0 and −3.5 degrees per second. The maximum limit of 0.0 prevents the throttles from advancing forward during the throttle retard maneuver. The lower limit of −3.5 is based upon the highest retard rate one could expect to reduce the throttles. Other limit values may be used depending on the response characteristics of a particular aircraft. In addition, a more refined estimation of the time to touchdown may be accomplished as a function of current airspeed or other factors.

The calculated retard rate adjustment signal 12 is calculated on the basis of the extent of overspeed or underspeed present. The present invention autothrottle system calculates the amount of underspeed or overspeed present at a second combiner 20 by determining the difference between the aircraft's current airspeed, as represented by a first input signal $V_C$, and a commanded airspeed (e.g., an FMC commanded airspeed, a Mode Control Panel commanded airspeed, or the like), as represented by a second input signal $V_{CMD}$. The difference between the first and second input signals is an error signal $\Delta V$. A positive airspeed error signal $\Delta V$ corresponds to an overspeed condition. A negative airspeed error signal $\Delta V$ corresponds to an underspeed condition.

During specified conditions (at A/T RETARD=TRUE for the embodiment of FIG. 1), a latch switch 22 moves to an alternative position that captures the last value of the airspeed error signal $\Delta V$ and continuously provides that value to a bias component 24 that determines an appropriate value for the calculated retard rate adjustment signal that is to be used as an input to the first combiner 14. During overspeed, the scheduler calculates the retard rate adjustment signal 12 as a negative number, thus increasing the rate of retard to idle from nominal at the first combiner 14. During underspeed, the scheduler calculates the retard rate adjustment signal 12 as a positive number, thus lessening the rate of retard to idle from nominal at the first combiner 14.

The bias component 24 in the embodiment of FIG. 1 is a linear rate calculation with a dead zone for moderate airspeed errors $\Delta V$ and retard rate adjustment limits for extreme airspeed errors $\Delta V$. In particular, for airspeed errors at or between −2.5 knots and 2.5 knots, the calculated retard rate adjustment signal is set to zero. For underspeed airspeed errors less than −8.5 knots, the retard rate adjustment signal is limited to no greater than 1.2 degrees per second. Between −8.5 knots and −2.5 knots, the retard rate adjustment signal changes linearly at a rate of −0.2 degrees per second. For overspeed airspeed errors greater than 8.5 knots, the retard rate adjustment signal is limited to no less than −1.2 degrees per second. Between 2.5 and 8.5 knots, the retard rate adjustment signal also changes linearly at a rate of −0.2 degrees per second.

The bias component 24 of FIG. 1 is one of a number of possible methods and scheduling constructs that may be used in the present invention to determine the value of the calculated retard rate adjustment signal. What is important to the present invention is that the resulting retard rate output signal RTRDFS is reduced for underspeed conditions and increased for overspeed conditions, as calculated relative to the retard rate appropriate for an airspeed error signal $\Delta V$ of zero, i.e., relative to nominal.

Shown in FIG. 1 are a number of switches used to activate the present invention autothrottle system retard rate logic. In particular, there is the first latch switch 22, a second switch 26, a third switch 28, and a fourth switch 30. There are also various logic constructs used to trigger the switches between default and alternative positions. The embodiment of FIG. 1 is one of a number of arrangements that may be used in the present invention. Other arrangements are possible.

The second switch 26 is located between the output of the bias component and the first combiner. The second switch 26 has a default position in which the value of the calculated retard rate adjustment signal 12 is set to a null signal 32. In an alternative position, the second switch 26 sets the value of the calculated retard rate adjustment signal 12 to that output value determined by the bias component 24. In the embodiment of FIG. 1, the second switch 26 is triggered by an autothrottle retard trigger signal A/T RETARD. In the default case, the signal A/T RETARD is false and the second switch 26 is in its default position. When the signal A/T RETARD becomes true, the second switch 26 moves to its alternative position. The trigger signal A/T RETARD is set to true at a first AND logic gate 34, preferably when the aircraft is in an approach flare position, both autopilots are engaged (where available), and the current aircraft radio altitude is at or below 24 feet. The trigger signal A/T RETARD is also used to trigger the first latch switch 22.

The third switch 28 is positioned between the second switch 26 and the first combiner 14 as means to further refine the instances when the retard rate RTRDFS should be adjusted. The third switch 28 is triggered by an AUTOMATIC LANDING MODE signal. When the AUTOMATIC LANDING MODE signal is false, the third switch 28 is in a default position that provides a null signal to the first combiner 14. When the AUTOMATIC LANDING MODE signal is true, the third switch 28 moves to input the bias component output to the first combiner 14. The AUTOMATIC LANDING MODE signal is set to true at a second AND logic gate 36 when 1) the aircraft is in approach flare and 2) the aircraft is in one of its vertical control modes or when A/T RETARD is true (e.g., when the aircraft is in approach flare and radio altitude is less than or equal to 24 feet.) Other trigger logic may be used as appropriate for a particular application.

The fourth switch 30 is located along the input path to the nominal rate determination block 16. The fourth switch 30 is triggered by a RETARD FLAG signal. When the RETARD FLAG signal is false, the fourth switch 30 is in a default position in which the null signal is provided to the nominal rate determination block 16. This results in a calculation of RTRDFS as zero, which informs the control system not to retard the engine thrust. When the RETARD FLAG signal is true, the fourth switch 30 inputs the values of TRA and TRAIDLE into the nominal rate determination component 16.

In one embodiment, the RETARD FLAG signal is the same value as the AUTOMATIC LANDING MODE signal. In an alternative embodiment, the RETARD FLAG is set at a first OR gate 38 (shown in phantom) that outputs a true RETARD FLAG signal if either the AUTOMATIC LANDING MODE signal is true or a MANUAL LANDING MODE signal is true. The MANUAL LANDING MODE signal is set to true when the aircraft is at or below 27 feet with the autopilot system off, and the autothrottle system on. This OR gate 38 is provided as a way to mirror known aircraft autothrottle control systems that reduce the engine throttle setting to idle during this circumstance without using any type of retard rate adjustment.

The physical configuration of how and where the various components are positioned may vary greatly. In the embodiment of FIG. 1, the autopilot determines when the throttles will be retarded and particularly calculates the state of the A/T RETARD trigger signal. The autopilot also detects the overspeed or underspeed conditions at the second combiner 20. The autopilot further calculates the value of the retard rate adjustment signal at the bias component 24. The output of the bias component is transferred to an autothrottle computer either directly or through the Mode Control Panel (MCP).

As will be appreciated from a reading of the above, an autothrottle system formed in accordance with the present invention retards thrust more slowly for underspeed conditions and faster for overspeed cases, relative to a nominal retard rate. For overspeed cases, the additional incremental thrust due to the slower retard helps arrest airspeed loss, which prevents hard landings and causes the aircraft to use additional runway distance. For overspeed cases, the faster retard rate adds to nose-down pitching moment and prevents the aircraft from floating down the runway. The net result of an autothrottle system so improved is a reduction in the number of hard and soft landings and a corresponding reduction in sink rates that may produce discomfort to passengers and landings that may use too much runway distance, respectively.

In a large number of landings using the present invention autothrottle retard system improvement, a reduction in the standard deviation of the touchdown sink rate is achieved, since most of the hard landings can be made to land softer and most of the soft landings can be made to touchdown slightly firmer. Similarly, the standard deviation of the touchdown distance is also reduced since the short landings are made to land longer and the long landings are made to touchdown shorter, the mean touch down distance remaining approximately the same. During aircraft certification, these features may be important in meeting regulatory autoland footprint deviation criteria.

Alternative embodiments are possible depending on the requirements of a particular situation. For example, the −2.5 and +2.5 deadband region in block 24 could be shifted to the "left" to coincide with the more negative numbers (e.g., the points −5.0 and 0.0, respectively.) This would result in sending a negative signal 12 to the summing junction 14 more often, resulting in a faster retard of the autothrottle. This "left" shift in block 24 could be used to control a large number of long aircraft landings and make the aircraft landing distance shorter. As a corollary, if the airplane had a tendency to land short, a "right" shift in the dead zone (e.g., to coincide with 0.0 and +5.0, respectively) could be used to slow down the retard rate and assist the airplane in landing further down the runway.

While the preferred embodiment of the invention has been illustrated and described, it will be appreciated that various changes can be made therein without departing from the spirit and scope of the invention. The overall structure explained herein should therefore be taken as exemplary, and not restrictive. For example, the embodiment of an autothrottle system shown in FIG. 1 is formed as a latched system. It is also possible to form the present invention autothrottle system as a feedback system that recalculates the value of the calculated retard rate adjustment signal. In addition, it is also to be understood that certain applications may not benefit from the inclusion of all elements described with reference to the embodiment of FIG. 1. In a like manner, certain known control elements, not shown or described, could be added to obtain a specific desired result in addition to the herein described adjustment of the throttle retard rate signal RTRDFS.

The embodiments of the invention in which an exclusive property or privilege is claimed are defined as follows:

1. In an autothrottle control system having the capability to reduce engine throttle setting from a first position to an idle position during landing by use of a nominal retard rate signal calculated as the angular difference between a current engine throttle control lever position and an idle engine throttle control lever position, the difference being divided by an amount of time to touchdown, an improvement comprising:

calculating a retard rate adjustment signal as a function of the difference between current airspeed and a commanded airspeed, the retard rate adjustment signal being expressed as an angular amount per time;

combining the nominal retard rate signal with the retard rate adjustment signal to form a retard rate output signal; and using the retard rate output signal to control the movement of engine throttles to idle;

wherein the retard rate adjustment signal decreases the rate of throttle reduction during underspeed conditions and increases the rate of throttle reduction during overspeed conditions thereby helping to avoid hard and soft landings, respectively.

2. The improvement according to claim 1, wherein the retard rate output signal is limited to a value between about 0.0 and −3.5 degrees per second.

3. In an autothrottle control system having the capability to reduce engine throttle setting from a first position to an idle position during landing, the improvement comprising calculating a rate of throttle reduction as a function of the difference between current airspeed and a commanded airspeed;

wherein the rate of throttle reduction is calculated as a function of the combination of a nominal retard rate value and a retard rate adjustment value, the retard rate adjustment value being calculated as a function of the difference between current airspeed and a commanded airspeed; and wherein the nominal retard rate value is equal to the angular difference between a current engine throttle control lever position and an idle engine throttle control lever position, the difference being divided by an amount in the range of about 3 seconds to about 10 seconds.

4. The improvement according to claim 1, wherein the retard rate adjustment signal is calculated as a function of a latched difference between current airspeed and commanded airspeed.

5. The improvement according to claim 1, wherein the retard rate adjustment signal varies linearly depending upon the difference between current airspeed and commanded airspeed.

6. The improvement according to claim 1, wherein the retard rate adjustment signal is set to zero when the difference between current airspeed and commanded airspeed is at or between about −2.5 knots and +2.5 knots; and wherein the retard rate adjustment signal varies linearly at difference values less than and greater than these amounts.

7. The improvement according to claim 6, wherein the retard rate adjustment signal is set to about +1.2 degree per second when the difference between current airspeed and commanded airspeed is less than about −8.5 knots; the retard rate adjustment signal is set to about −1.2 degree per second when the difference between current airspeed and commanded airspeed is greater than about +8.5 knots; and the retard rate varies linearly when the difference is between −2.5 to −8.5 and +2.5 to +8.5.

8. The improvement according to claim 1, wherein the retard rate adjustment signal is zero when the difference between current airspeed and commanded airspeed is at or between about −5 knots and 0 knots; and the retard rate adjustment signal varies linearly at difference values less than and greater than these amounts.

9. The improvement according to claim 1, wherein the retard rate adjustment signal is zero when the difference between current airspeed and commanded airspeed is at or between about 0 knots and +5 knots; and the retard rate adjustment signal varies linearly at difference values less than and greater than these amounts.

10. The improvement according to claim 1, wherein the calculating of the rate of throttle reduction is accomplished during a flare approach maneuver with an autopilot system engaged and the aircraft at or below about 24 feet.

11. In an autothrottle control system having automatic landing capability during which an engine throttle is reduced from a first position to an idle position, the improvement comprising a throttle rate reduction signal comprising:

(a) a nominal retard rate signal; and (b) a retard rate adjustment signal calculated as a function of the difference between current airspeed and a commanded airspeed; wherein during an underspeed condition the retard rate adjustment signal decreases the rate of throttle reduction, and during an overspeed condition the retard rate adjustment signal increases the rate of throttle reduction;

wherein the nominal retard rate signal is equal to the angular difference between a current engine throttle control lever position and an idle engine throttle control lever position, the difference being divided by an amount in the range of about 3 seconds to about 10 seconds.

12. In an autothrottle control system having the capability to reduce engine throttle setting from a first position to an idle position during landing by use of a nominal retard rate signal calculated as the angular difference between a current engine throttle control lever position and an idle engine throttle control lever position, the difference being divided by an amount of time to touchdown, an improvement comprising:

calculating a retard rate adjustment signal as a function of the difference between current airspeed and a commanded airspeeds the retard rate adjustment signal being expressed as an angular amount per time; the calculating of the rate of throttle reduction being accomplished during a flare approach maneuver with an autopilot system engaged and the aircraft at or below about 24 feet; the retard rate adjustment signal being set to zero when the difference between current airspeed and commanded airspeed is at or between about −2.5 knots and +2.5 knots, the retard rate adjustment signal being sent to about +1.2 degree per second when the difference between current airspeed and commanded airspeed is less than about −8.5 knots; the retard rate adjustment signal being set to about −1.2 degree per second when the difference between current airspeed and commanded airspeed is greater than about +8.5 knots; and the retard rate adjustment signal varying linearly when the difference is between −2.5 to −8.5 and +2.5 to +8.5;

combining the nominal retard rate signal with the retard rate adjustment signal to form a retard rate output signal, the retard rate output signal being limited to a value between about 0.0 and −3.5 degrees per second; and using the limited retard rate output signal to control the movement of engine throttles to idle; wherein the retard rate adjustment signal decreases the rate of throttle reduction during underspeed conditions and increases the rate of throttle reduction during overspeed conditions thereby helping to avoid hard and soft landings, respectively.

* * * * *